(12) United States Patent
Zhu

(10) Patent No.: US 11,827,266 B2
(45) Date of Patent: Nov. 28, 2023

(54) BRAKING MECHANISM AND BABY CARRIAGE

(71) Applicant: WONDERLAND SWITZERLAND AG, Steinhausen (CH)

(72) Inventor: Wanquan Zhu, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 93 days.

(21) Appl. No.: 17/517,198

(22) Filed: Nov. 2, 2021

(65) Prior Publication Data
US 2022/0135106 A1 May 5, 2022

(30) Foreign Application Priority Data
Nov. 2, 2020 (CN) .......................... 202022497643.5

(51) Int. Cl.
*F16D 63/00* (2006.01)
*B62B 9/08* (2006.01)
*B62B 5/04* (2006.01)

(52) U.S. Cl.
CPC ............ *B62B 9/082* (2013.01); *B62B 5/0433* (2013.01); *B62B 5/0461* (2013.01); *B62B 9/087* (2013.01); *F16D 63/006* (2013.01)

(58) Field of Classification Search
CPC ....... B62B 9/082; B62B 9/087; B62B 5/0433; B62B 5/0457; B62B 5/0461; F16D 63/006
USPC ..................................................... 188/20, 31
See application file for complete search history.

(56) References Cited

U.S. PATENT DOCUMENTS

| 4,527,665 A * | 7/1985 | Shamie ................... B62B 9/087 188/200 |
| 4,953,667 A | 9/1990 | Bigo |
| 5,415,252 A * | 5/1995 | Estkowski .......... B60B 33/0042 16/35 R |
| 6,170,615 B1 * | 1/2001 | Cheng ..................... B62B 9/082 280/47.38 |
| 8,540,059 B2 * | 9/2013 | Li .......................... B62B 9/082 188/73.1 |

(Continued)

FOREIGN PATENT DOCUMENTS

| CN | 1120004 A | 4/1996 |
| CN | 201214442 Y | 4/2009 |

(Continued)

OTHER PUBLICATIONS

EPO translation EP 1176080 A2. (Year: 2002).*

*Primary Examiner* — Thomas J Williams
(74) *Attorney, Agent, or Firm* — HAUPTMAN HAM, LLP

(57) ABSTRACT

Disclosed is a braking mechanism for locking a wheel of a baby carriage. The braking mechanism includes a driving member and a locking member. The driving member is pivotally connected to a wheel seat of a frame of the baby carriage, a guiding opening is arranged in the wheel seat, an engaging part is arranged on a side surface of a hub of the wheel, a driving slot is arranged in the driving member, one end of the locking member is slidably arranged in the driving slot, and another end of the locking member is configured to slidably pass through the guiding opening, so that when the driving member rotates, the driving member drives the locking member to engage with the engaging part or disengage from the engaging part. In addition, the present invention further discloses a baby carriage.

19 Claims, 12 Drawing Sheets

(56) References Cited

U.S. PATENT DOCUMENTS

| | | | |
|---|---|---|---|
| 9,174,662 B2 | 11/2015 | Zhang | |
| 2003/0066716 A1* | 4/2003 | Liu | B62B 5/04<br>188/68 |
| 2009/0139805 A1* | 6/2009 | Santamaria | B62B 9/082<br>188/20 |
| 2022/0135106 A1* | 5/2022 | Zhu | B62B 9/082<br>188/20 |

FOREIGN PATENT DOCUMENTS

| | | | | |
|---|---|---|---|---|
| CN | 101905710 A | | 12/2010 | |
| CN | 103448781 A | | 12/2013 | |
| CN | 105270463 B | | 1/2016 | |
| CN | 205632619 U | * | 10/2016 | |
| CN | 205632619 U | | 10/2016 | |
| CN | 206297599 U | | 7/2017 | |
| CN | 207565666 U | | 7/2018 | |
| EP | 1176080 A2 | * | 1/2002 | B62B 9/082 |
| EP | 1176080 A3 | | 1/2002 | |

* cited by examiner

BRAKING MECHANISM AND BABY CARRIAGE

CROSS-REFERENCE TO RELATED APPLICATIONS

The present application claims the priority of the Chinese Patent Application No. 202022497643.5, filed on Nov. 2, 2020 and titled BRAKING MECHANISM AND BABY CARRIAGE, and the content of which is incorporated by reference herein in its entirety, the specification of which is incorporated by reference herein in its entirety.

TECHNICAL FIELD

The present application relates to a baby carriage, more particularly, to a braking mechanism.

BACKGROUND

Existing baby carriages generally have a braking mechanism. If a user wants to have the baby carriage stop moving, the user only needs to step on the braking mechanism, and the braking mechanism may lock the wheel of the baby carriage, thereby preventing the baby carriage from moving, avoiding occurrence of accidents, and improving the safety. However, there are generally two types of braking mechanisms for the existing baby carriages. One type of braking mechanism is used for locking a single wheel, accordingly two braking mechanisms must be arranged to brake two rear wheels respectively. The other type of braking mechanism is used for locking two wheels at the same time. In either case, the existing braking mechanism has disadvantages of complex structure and is inconvenient to operate.

SUMMARY

The objective of the present application is to provide a braking mechanism having a simple structure and is convenient to operate.

Another objective of the present application is to provide a baby carriage having a simple braking mechanism and being convenient to brake.

In order to achieve the above objectives, the present application provides a braking mechanism used for locking a wheel of a baby carriage. The braking mechanism includes a driving member and a locking member. The driving member is pivotally connected to a wheel seat of a frame of the baby carriage, a guiding opening is arranged in the wheel seat, an engaging part is arranged on a side surface of a hub of the wheel, a driving slot is arranged in the driving member, one end of the locking member is slidably arranged in the driving slot, and another end of the locking member is configured to slidably pass through the guiding opening, so that when the driving member rotates, the driving member drives the locking member to engage with the engaging part or disengage from the engaging part.

Compared with the prior art, in the present application, the driving slot is arranged in the driving member, and the guiding opening is arranged in the wheel seat. The locking member is slidably arranged in both the driving slot and the guiding opening. When the driving member rotates, the driving member drives the locking member via the driving slot to slide along the guiding opening, so that the locking member may engage with the engaging part or disengage from the engaging part, thus achieving the purpose of locking or unlocking the wheel. The structure of the braking mechanism of the present application is very simple, only the operation for the rotation of the driving member is needed, and the operation is very convenient.

In some embodiments, the braking mechanism further includes an elastic member, the elastic member is arranged between the wheel seat and the locking member and configured to provide an elastic force to force the locking member to exit the engaging part.

In some embodiments, the braking mechanism further includes a pushing member, and the pushing member is arranged between the locking member and the elastic member.

In some embodiments, the locking member includes a connecting shaft and a locking shaft, the connecting shaft is sleeved in the pushing member, and the locking shaft engages with the engaging part.

In some embodiments, a distance from one end of the driving slot to a rotation central shaft of the driving member is less than a distance from another end of the driving slot to the rotation central shaft of the driving member.

In some embodiments, the engaging part is an engaging recess, the engaging recess surrounds a central shaft of the hub of the wheel, and an opening of the engaging recess faces the central shaft of the hub of the wheel.

In some embodiments, the hub of the wheel is provided with a ring groove, the ring groove is located between the engaging recess and the central shaft of the hub of the wheel, and the ring groove communicates with the engaging recess.

In some embodiments, a location limiting protrusion is arranged on one of the driving member and an inner side of the wheel seat, a location limiting slot is arranged on the other of the driving member and the inner side of the wheel seat, and the location limiting protrusion and the location limiting slot slidably engage with each other, to limit a rotation angle of the driving member.

In some embodiments, the location limiting protrusion engages with an end of the location limiting slot.

In some embodiments, the driving member is provided with a pedal.

In some embodiments, a rotation central shaft of the driving member is coaxial with a roll central shaft of the wheel.

In some embodiments, the braking mechanism further includes a location limiting member, the location limiting member is fixedly arranged on an inner side of the wheel seat, a location limiting protrusion is arranged on the location limiting member, a location limiting opening is arranged on a side surface of the driving member, and the location limiting protrusion engages with the location limiting opening, to limit a rotation angle of the driving member.

In some embodiments, an inner side of the location limiting member extends downwards to form a location limiting elastic piece, and the location limiting protrusion is arranged on the location limiting elastic piece.

In some embodiments, the wheel seat has an inverted U-shaped structure.

In some embodiments, the driving slot has a bent structure.

In some embodiments, one end of the elastic member abuts against the wheel seat, and another end of the elastic member abuts against the pushing member.

In some embodiments, the locking shaft and the connecting shaft are perpendicular to each other.

In some embodiments, the ring groove is configured to receive the locking member when the wheel is unlocked.

In some embodiments, the locking member has a column-shaped structure.

A baby carriage includes a frame, a wheel and the braking mechanism. The braking mechanism is arranged between the frame and the wheel to lock the wheel or unlock the wheel.

Figure 1:
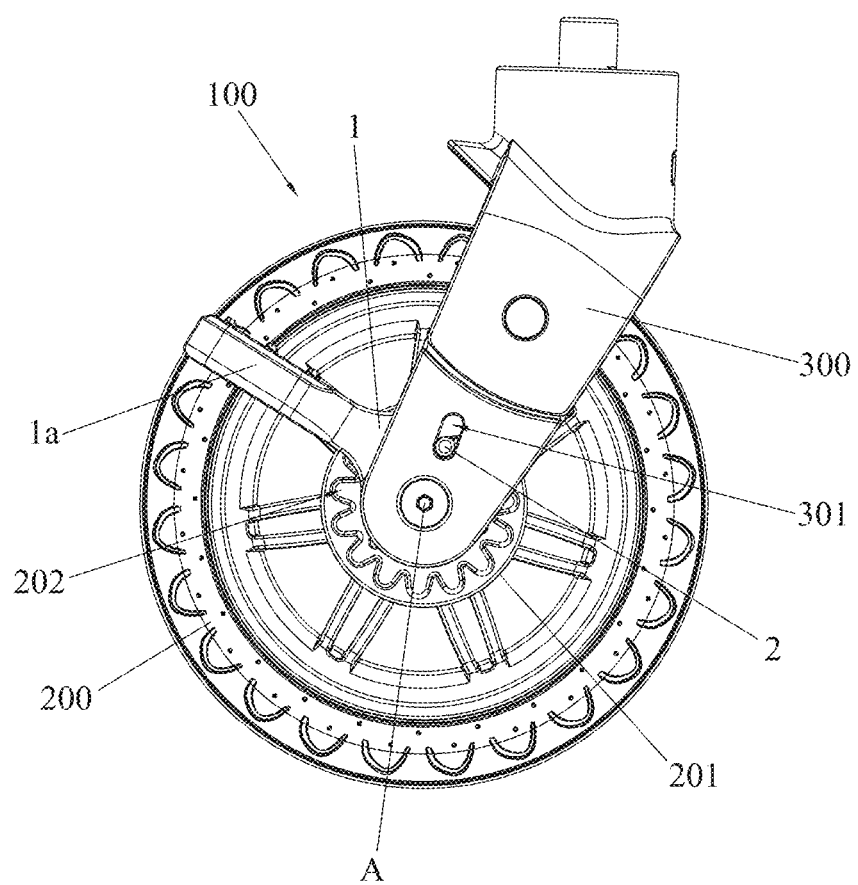
FIG. 1 is a state view of a braking mechanism installed on a rear wheel of a baby carriage according to a first embodiment of the present application.
Figure 2:
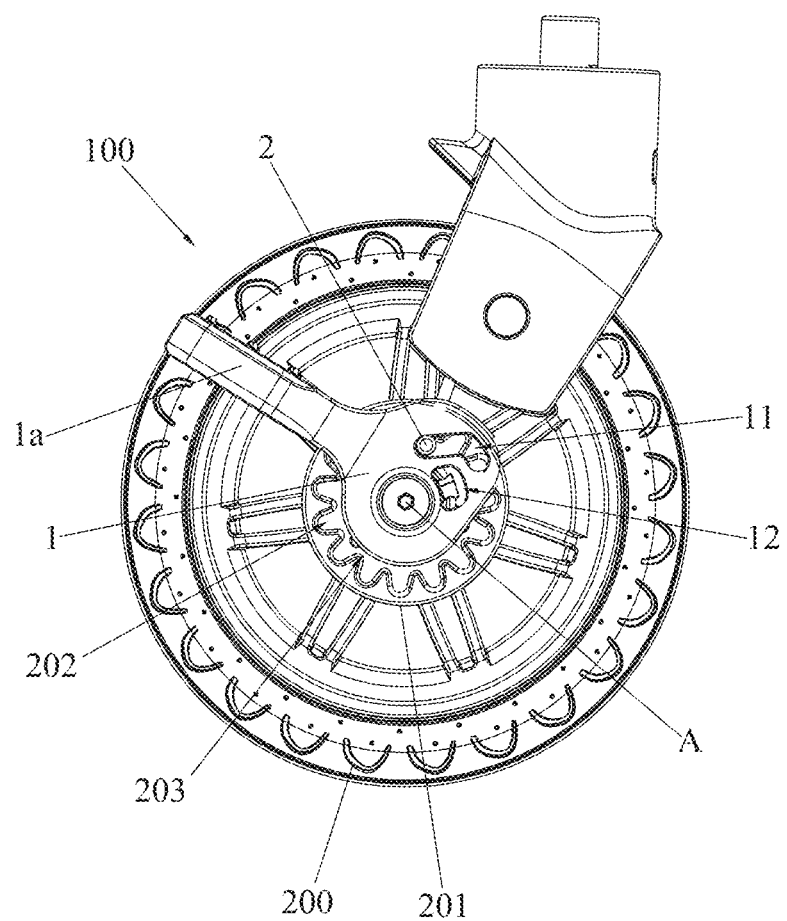
FIG. 2 is a side view of the braking mechanism and the rear wheel according to the first embodiment of the present application.
Figure 3:
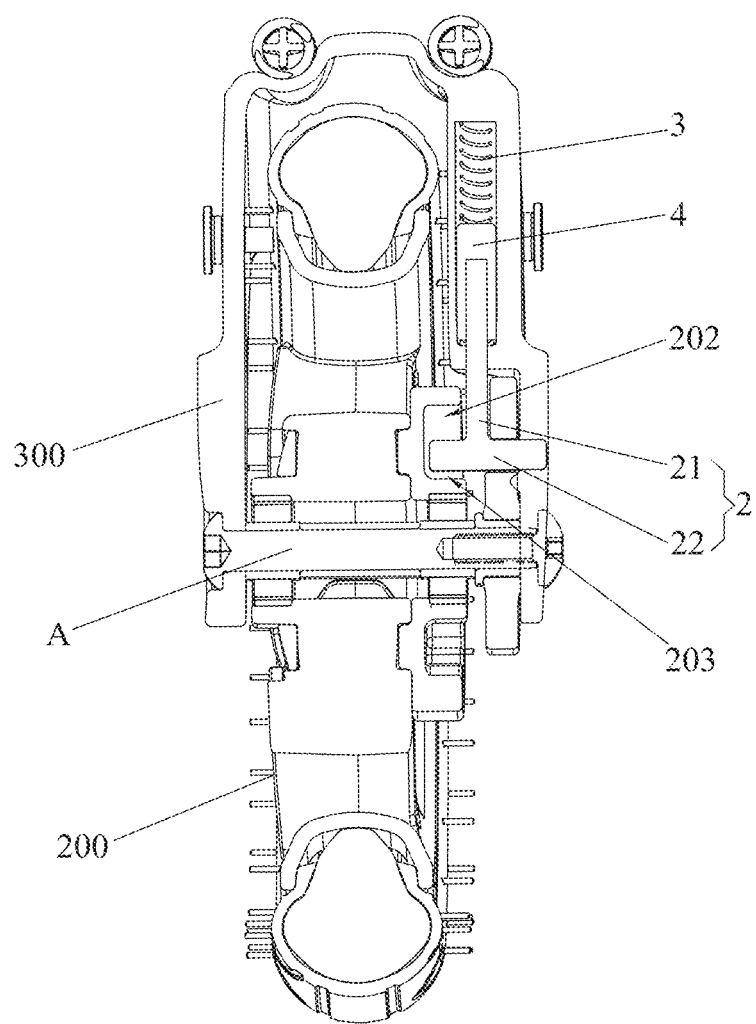
FIG. 3 is a front sectional view of the braking mechanism and the rear wheel according to the first embodiment of the present application.
Figure 4:
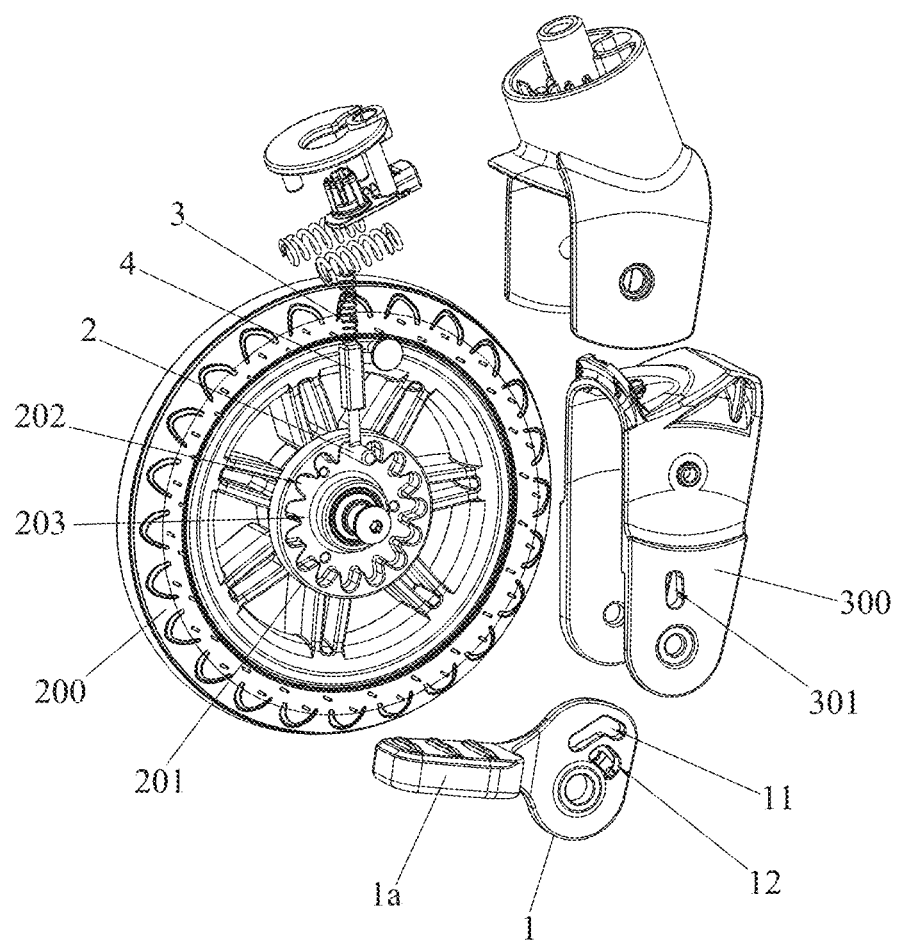
FIG. 4 is an exploded view of the braking mechanism and the rear wheel according to the first embodiment of the present application.
Figure 5:
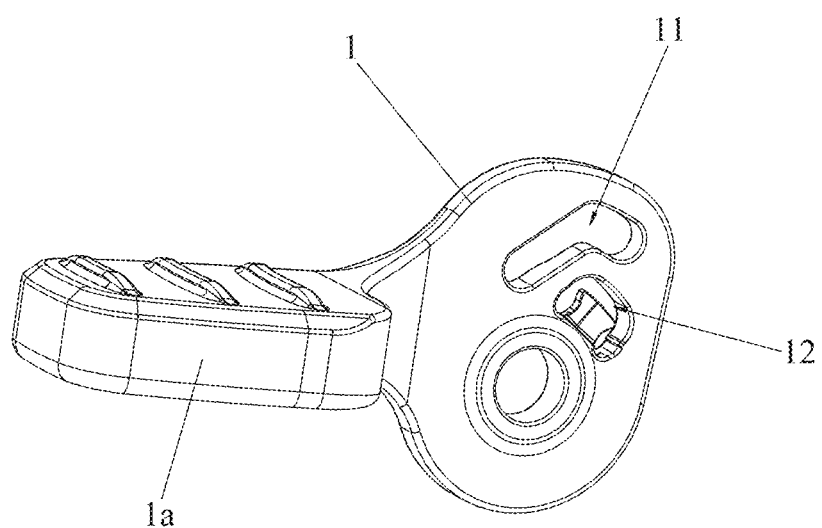
FIG. 5 is a structural view of a driving member of the braking mechanism according to the first embodiment of the present application.

REFERENCE NUMERALS braking mechanism 100, rear wheel 200, wheel seat 300, driving member 1, locking member 2, elastic member 3, pushing member 4, location limiting member 5, hub 201, engaging part 202, ring groove 203, guiding opening 301, location limiting protrusion 302, pedal 1a, driving slot 11, location limiting slot 12, rotation central shaft A, connecting shaft 21, locking shaft 22, location limiting elastic piece 51, location limiting protrusion 52, location limiting opening 13.

DETAILED DESCRIPTION OF THE EMBODIMENTS

In order to illustrate the technology contents, the structural features, and the achieved effects of the present application in detail, they will be illustrated by combining with the accompanying drawings hereafter.

Referring to FIGS. 1 to 9, which show the structure of a first embodiment of the present application.

As shown in FIG. 1, a baby carriage of the present application may be a baby buggy or a game playing bed. The baby carriage includes a frame, wheels, and a braking mechanism 100. Four wheels are provided. Two wheels are arranged at the front end of the frame and function as front wheels, and the other two wheels are arranged at the rear end of the frame and function as rear wheels 200. The braking mechanism 100 is arranged between the frame and the rear wheel 200, to lock or unlock the rear wheel 200. The specific solutions are as follows.

Referring to FIGS. 2 to 5, the braking mechanism 100 includes a driving member 1, a locking member 2, and an elastic member 3. A pedal 1a extends outward from one side of the driving member 1, and the pedal 1a has a flat structure. The driving member 1 is pivotally connected to a wheel seat 300 of the frame of the baby carriage, the wheel seat 300 has an inverted U-shaped structure. The rear wheel 200 is rollably arranged on the wheel seat 300. The locking member 2 has a column-shaped structure. The driving member 1 is pivotally connected to a rotation central shaft A of the wheel seat 300, and the rotation central shaft A is coaxial with a roll central shaft of the rear wheel 200. A guiding opening 301 is arranged in one side of the wheel seat 300, and an engaging part 202 is arranged on a side surface of the hub 201 of the rear wheel 200. The engaging part 202 is an engaging recess. The engaging recess surrounds the central shaft of the hub 201 of the rear wheel 200, that is, the roll central shaft of the rear wheel 200, and the opening of the engaging recess faces the central shaft of the hub 201 of the rear wheel 200. The hub 201 of the rear wheel 200 is provided with a ring groove 203, and the ring groove 203 is located between the engaging recess and the central shaft of the hub 201 of the rear wheel 200. The ring groove 203 communicates with the engaging recess. The ring groove 203 may receive the locking member 2 when the rear wheel 200 is unlocked, to prevent the locking member 2 from interfering with the rotation of rear wheel 200. A driving slot 11 is arranged in the driving member 1, and the driving slot 11 has a bent structure. One end of the locking member 2 is slidably arranged in the driving slot 11, and another end of the locking member 2 slidably passes through the guiding opening 301. A distance from one end of the driving slot 11 to the rotation central shaft A of the driving member 1 is less than a distance from another end of the driving slot 11 to the rotation central shaft A of the driving member 1. When the driving member 1 rotates, the driving member 1 drives the locking member 2 to engage with the engaging part 202 or disengage from the engaging part 202. The elastic member 3 is arranged between the wheel seat 300 and the locking member 2, and is configured to provide an elastic force to force the locking member 2 to exit the engaging part 202.

In addition, the driving member 1 is pivotally connected to an inner side of the wheel seat 300 of the frame of the baby carriage. The wheel seat 300 may cover an outer side of the braking mechanism and only allows the locking member 2 to slide in the guiding opening 301, so that muddy and water from the outside will not enter the hub 201, thereby effectively preventing the muddy and water from affecting the braking function.

Referring to FIGS. 3 and 4 again, the braking mechanism 100 further includes a pushing member 4, and the pushing member 4 is arranged between the locking member 2 and the elastic member 3. One end of the elastic member 3 abuts against the wheel seat 300, and another end of the elastic member 3 abuts against the pushing member 4. The locking member 2 includes a connecting shaft 21 and a locking shaft 22, and the locking shaft 22 and the connecting shaft 21 are perpendicular to each other. The connecting shaft 21 is sleeved in the pushing member 4, and the locking shaft 22 engages with the engaging part 202.

Figure 6:
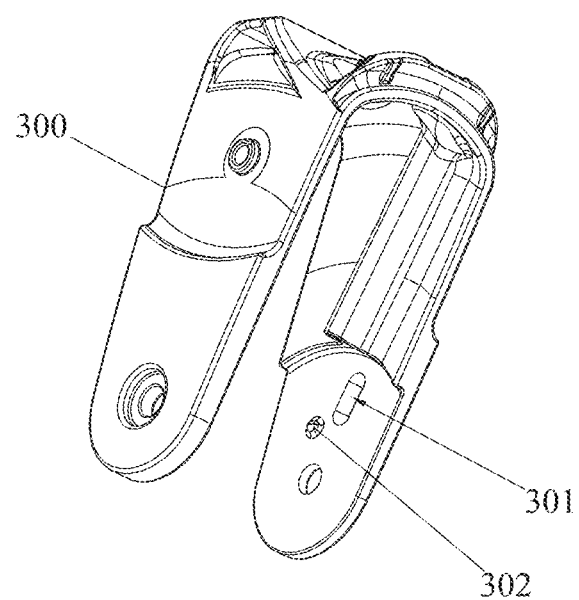
FIG. 6 is a structural view of a wheel seat of the baby carriage of the present application.

In addition, as shown in FIG. 6, a location limiting protrusion 302 is arranged on either one of the driving member 1 and the inner side of the wheel seat 300, and a location limiting slot 12 is arranged on the other of the driving member 1 and the inner side of the wheel seat 300. The location limiting protrusion 302 and the location limiting slot 12 slidably engage with each other, to limit the rotation angle of the driving member 1. The location limiting slot 12 has a U-shaped structure, and the location limiting protrusion 302 may engage with either end of the U-shaped structure. Because the location limiting slot 12 has the U-shaped structure, when the location limiting protrusion 302 is located at either end of the location limiting slot 12, the location limiting protrusion 302 may engage with the end of the location limiting slot 12. Only when a certain force is artificially applied, the location limiting protrusion 302 and the location limiting slot 12 slide relative to each other. In this way, the purpose of limiting location may be achieved, thus avoiding an accidental rotation of the driving member 1.

Figure 7:
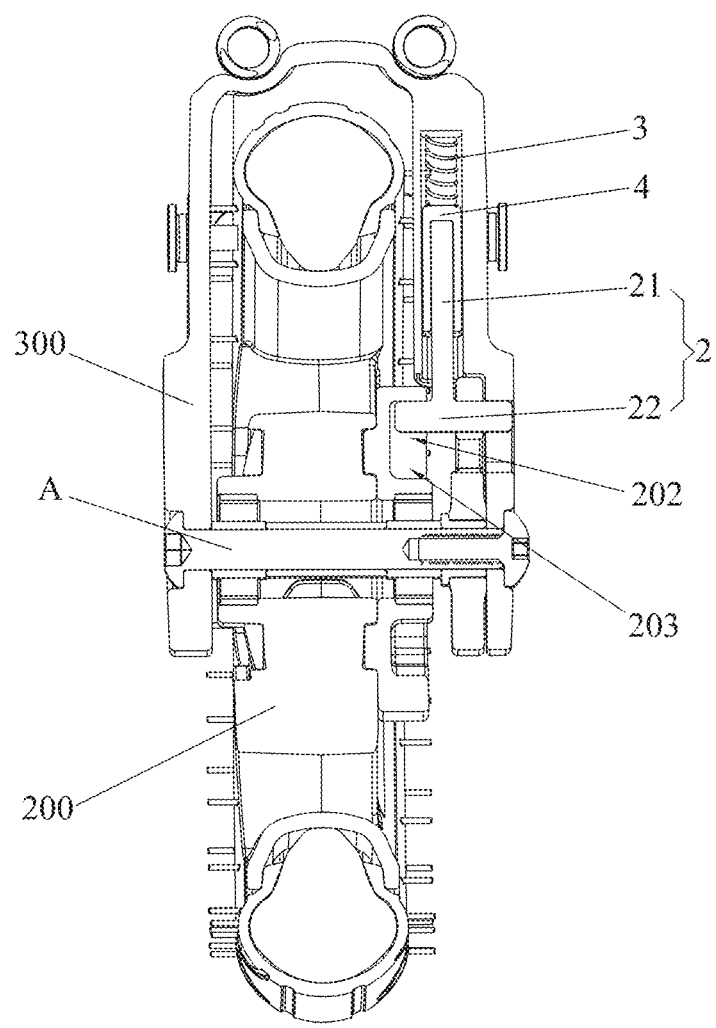
FIG. 7 is a front sectional view of the braking mechanism when it brakes the rear wheel according to the first embodiment of the present application.
Figure 8:
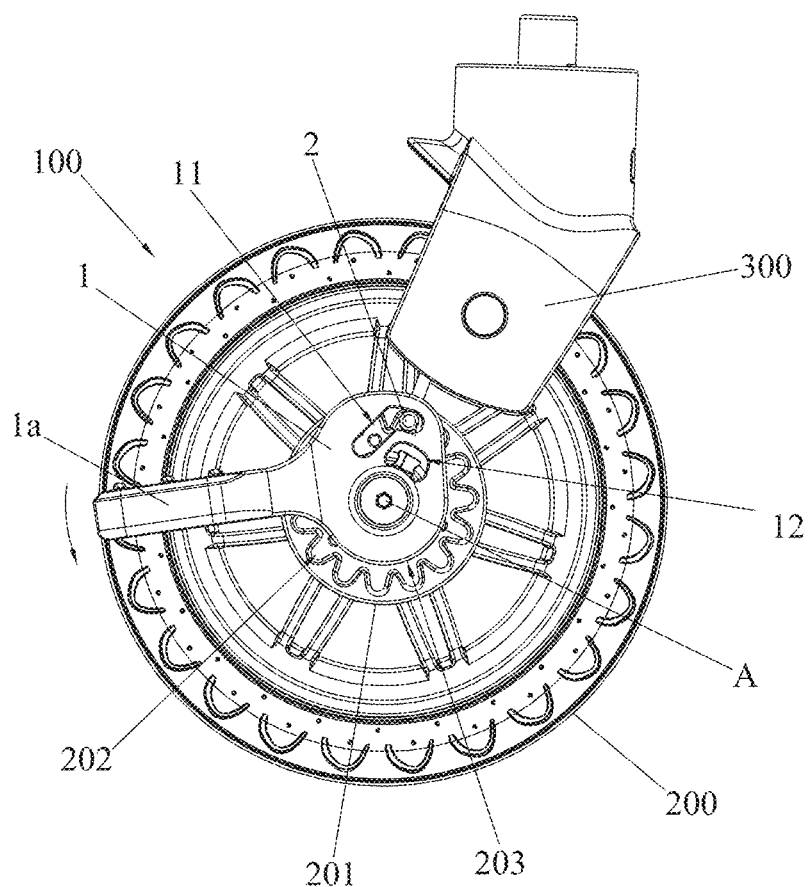
FIG. 8 is a side structural view of the braking mechanism when it brakes the rear wheel according to the first embodiment of the present application.
Figure 9:
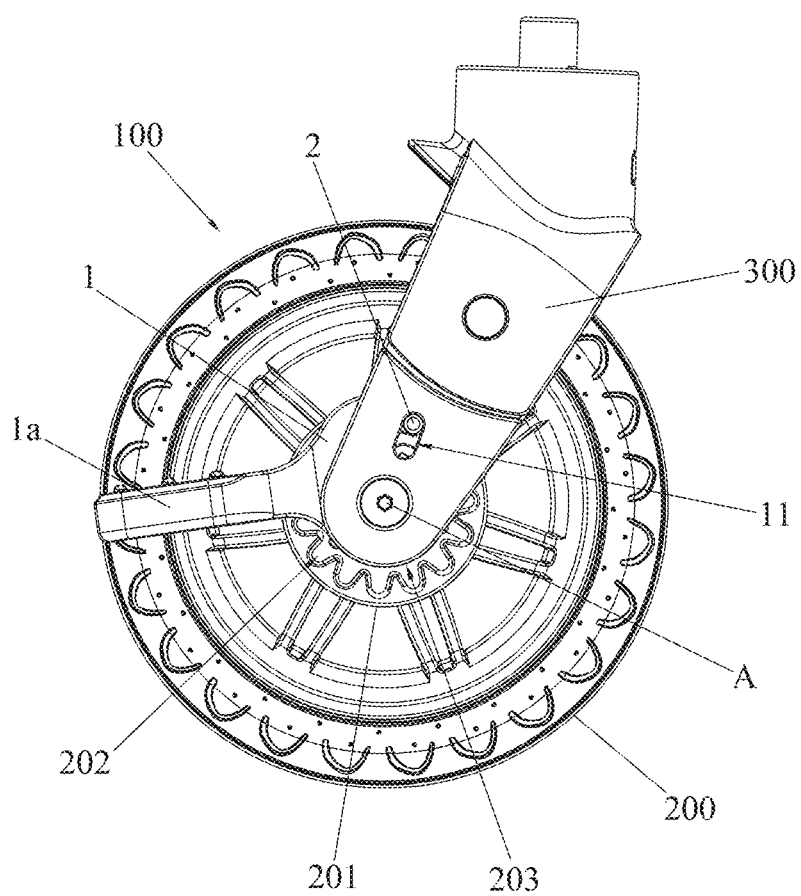
FIG. 9 is a state view of the braking mechanism when it brakes the rear wheel according to the first embodiment of the present application.

As can be known from the description above and with reference to FIGS. 7-9, when the user wants to brake the baby carriage, the user steps on the pedal 1a of the driving member 1, forcing the pedal 1a to rotate downward. The driving slot 11 of the driving member 1 rotates around the rotation central shaft A, thus driving the locking member 2. Under double restrictions of the driving slot 11 and the guiding opening 301, the locking member 2 slides upwards from one end of the guiding opening 301 to the other end of the guiding opening 301 along the guiding opening 301. At this time, the other end of the locking member 2 moves from the ring groove 203 into the engaging part 202, and then engages with the hub 201 of the rear wheel 200. While the pedal 1a is rotating, the location limiting slot 12 on the driving member 1 also rotates, so that the location limiting protrusion 302 slides from one end of the location limiting slot 12 to the other end and is restricted to the other end. At this time, the rear wheel 200 may be in a braked state. When the user wants to unlock the wheel, the user only needs to lift the pedal 1a. Under the elastic force of the elastic member 3, the elastic member 3 pushes the pushing member 4, and the pushing member 4 pushes the locking member 2 to move downwards to disengage from the engaging part 202 and enter the ring groove 203, thus unlocking the rear wheel 200.

Compared with the prior art, in the present application, the driving slot 11 is arranged in the driving member 1, and the guiding opening 301 is arranged in the wheel seat 300. The locking member 2 is slidably arranged in both the driving slot 11 and the guiding opening 301. When the driving member 1 rotates, the driving member 1 drives the locking member 2 via the driving slot 11 to slide along the guiding opening 301, so that the locking member 2 may engage with the engaging part 202 or disengage from the engaging part 202, thus achieving the purpose of locking or unlocking the rear wheel 200. The structure of the braking mechanism of the present application is very simple, only the operation for the driving member 1 to rotate is needed, and the operation is very convenient.

Figure 10:
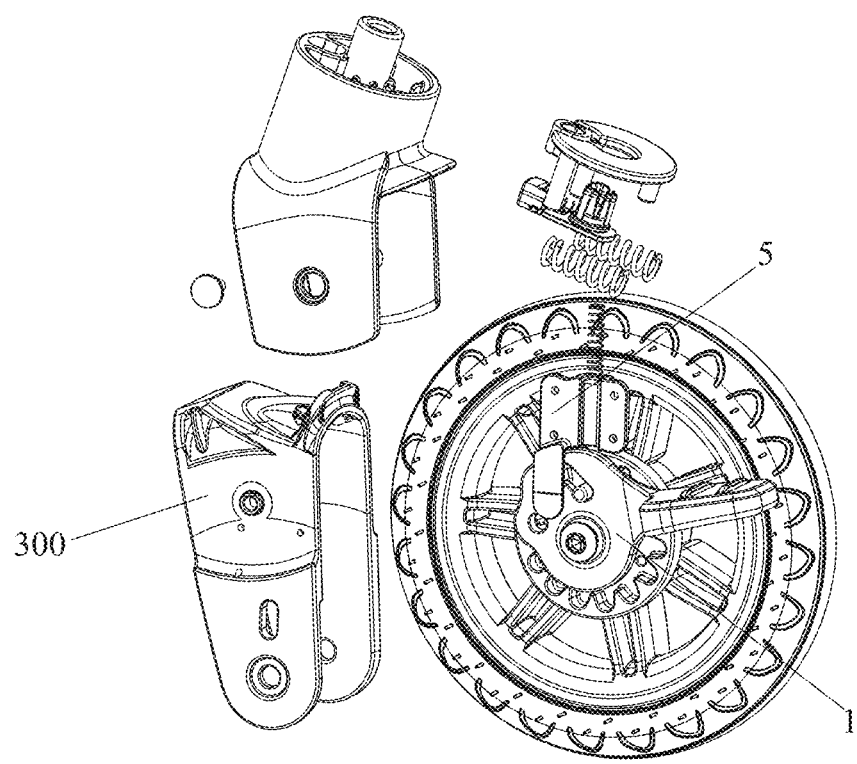
FIG. 10 is an exploded view of the braking mechanism and the rear wheel according to a second embodiment of the present application.
Figure 11:
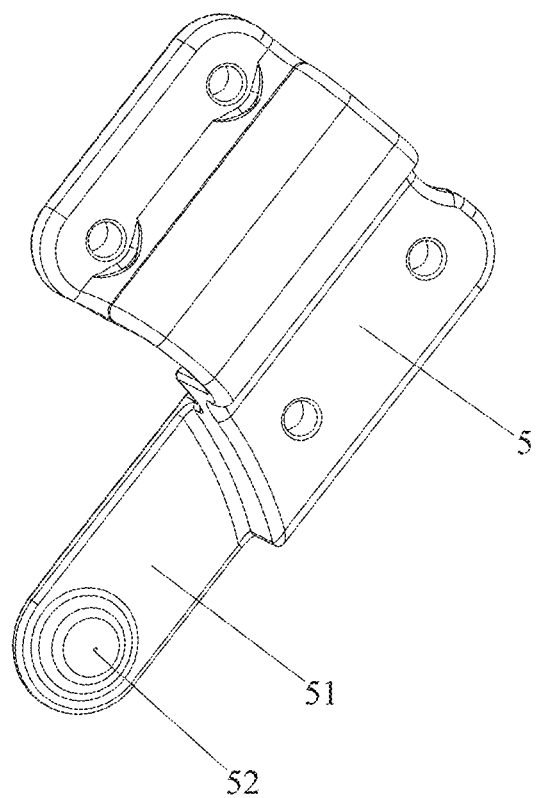
FIG. 11 is a structural view of a location limiting member of the braking mechanism according to the second embodiment of the present application.
Figure 12:
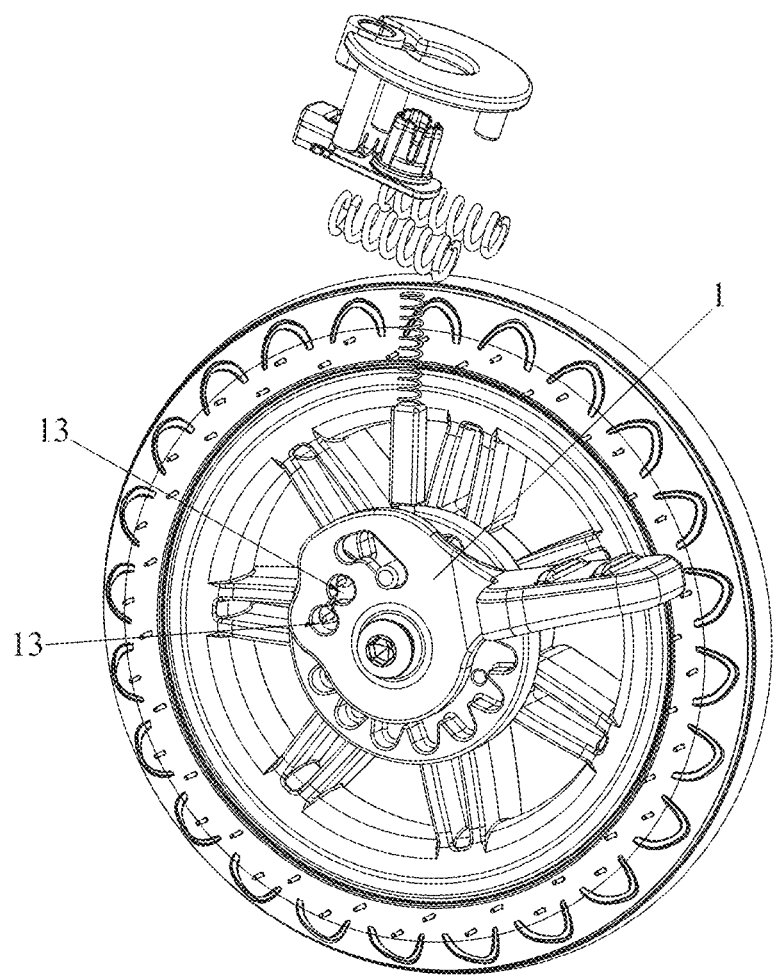
FIG. 12 is a structural view of the braking mechanism and the rear wheel according to the second embodiment of the present application.

Referring to FIGS. 10 to 12, which show the structure of the second embodiment of the present application.

The structure of the braking mechanism of this embodiment is basically identical with the structure of the braking mechanism 100 of the first embodiment. The difference of the two embodiments lies in the limiting manners of the driving member 1 and the wheel seat 300. The braking mechanism of this embodiment further includes a location limiting member 5, and the location limiting member 5 is fixedly arranged on the inner side of the wheel seat 300. The inner side of the location limiting member 5 extends downwards to form a location limiting elastic piece 51. A location limiting protrusion 52 is arranged on the location limiting elastic piece 51. At least two location limiting openings 13 are arranged on a side surface of the driving member 1. The location limiting protrusion 52 may selectively engage with the location limiting openings 13, to limit the rotation angle of the driving member 1. In this way, the purpose of limiting location may be achieved, thus avoiding the accidental rotation of the driving member 1. The effects of the braking mechanism of this embodiment are the same as those of the first embodiment, and will not be described repeatedly herein.

What disclosed above are some embodiments of the present application, but not intended to limit the scope of claims of the present application. Therefore, equivalent changes made according to the claims of the present application fall within the scope of the present application.

What is claimed is:

1. A braking mechanism for locking a wheel of a baby carriage, the braking mechanism comprising a driving member and a locking member, wherein:
   the driving member is pivotally connected to a wheel seat of a frame of the baby carriage;
   a guiding opening is arranged in the wheel seat;
   an engaging part is arranged on a side surface of a hub of the wheel;
   a driving slot is arranged in the driving member; and
   one end portion of the locking member is slidably arranged to engage with the engaging part or disengage from the engaging part, and another end portion of the locking member is configured to slidably pass through the driving slot and the guiding opening,
   wherein the braking mechanism further comprises an elastic member arranged between the wheel seat and the locking member and configured to provide an elastic force to force the locking member to exit the engaging part, and a pushing member arranged between the locking member and the elastic member.

2. The braking mechanism of claim 1, wherein the locking member comprises a connecting shaft and a locking shaft, the connecting shaft is sleeved in the pushing member, and the locking shaft engages with the engaging part.

3. The braking mechanism of claim 2, wherein the locking shaft and the connecting shaft are perpendicular to each other.

4. The braking mechanism of claim 1, wherein a distance from one end of the driving slot to a rotation central shaft of the driving member is less than a distance from another end of the driving slot to the rotation central shaft of the driving member.

5. The braking mechanism of claim 1, wherein:
   the engaging part is an engaging recess;
   the engaging recess surrounds a central shaft of the hub of the wheel; and
   an opening of the engaging recess faces the central shaft of the hub of the wheel.

6. The braking mechanism of claim 5, wherein:
   the hub of the wheel is provided with a ring groove;
   the ring groove is located between the engaging recess and the central shaft of the hub of the wheel; and
   the ring groove communicates with the engaging recess.

7. The braking mechanism of claim 6, wherein the ring groove is configured to receive the locking member when the wheel is unlocked.

8. The braking mechanism of claim 1, wherein:
   a location limiting protrusion is arranged on one of the driving member and an inner side of the wheel seat;
   a location limiting slot is arranged on the other of the driving member and the inner side of the wheel seat; and
   the location limiting protrusion and the location limiting slot slidably engage with each other, to limit a rotation angle of the driving member.

9. The braking mechanism of claim 8, wherein the location limiting protrusion engages with an end of the location limiting slot.

10. The braking mechanism of claim 1, wherein the driving member is provided with a pedal.

11. The braking mechanism of claim 1, wherein a rotation central shaft of the driving member is coaxial with a roll central shaft of the wheel.

12. The braking mechanism of claim 1, wherein the wheel seat has an inverted U-shaped structure.

13. The braking mechanism of claim 1, wherein the driving slot has a bent structure.

14. The braking mechanism of claim 1, wherein the locking member has a column-shaped structure.

15. A baby carriage, comprising a frame, a wheel, and the braking mechanism of claim 1, wherein the braking mechanism is arranged between the frame and the wheel.

16. A braking mechanism for locking a wheel of a baby carriage, the braking mechanism comprising a driving member and a locking member, wherein:
   the driving member is pivotally connected to a wheel seat of a frame of the baby carriage;
   a guiding opening is arranged in the wheel seat;
   an engaging part is arranged on a side surface of a hub of the wheel;
   a driving slot is arranged in the driving member;
   one end portion of the locking member is slidably arranged to engage with the engaging part or disengage from the engaging part, and another end portion of the locking member is configured to slidably pass through the driving slot and the guiding opening; and
   the braking mechanism further comprises a location limiting member, wherein:
      the location limiting member is fixedly arranged on an inner side of the wheel seat;
      a location limiting protrusion is arranged on the location limiting member;
      a location limiting opening is arranged on a side surface of the driving member; and
      the location limiting protrusion engages with the location limiting opening to limit a rotation angle of the driving member;
      an inner side of the location limiting member extends downwards to form a location limiting elastic piece, and the location limiting protrusion is arranged on the location limiting elastic piece.

17. A baby carriage, comprising a frame, a wheel, and the braking mechanism of claim 16, wherein the braking mechanism is arranged between the frame and the wheel.

18. A braking mechanism for locking a wheel of a baby carriage, the braking mechanism comprising a driving member and a locking member, wherein:
   the driving member is pivotally connected to a wheel seat of a frame of the baby carriage;
   a guiding opening is arranged in the wheel seat;
   an engaging part is arranged on a side surface of a hub of the wheel;
   a driving slot is arranged in the driving member;
   one end portion of the locking member is slidably arranged to engage with the engaging part or disengage from the engaging part, and another end portion of the locking member is configured to slidably pass through the driving slot and the guiding opening;
   the braking mechanism further comprises an elastic member arranged between the wheel seat and the locking member and configured to provide an elastic force to force the locking member to exit the engaging part; and
   one end of the elastic member abuts against the wheel seat, and another end of the elastic member abuts against a pushing member.

19. A baby carriage, comprising a frame, a wheel, and the braking mechanism of claim 18, wherein the braking mechanism is arranged between the frame and the wheel.

* * * * *